(12) United States Patent
Spangelo et al.

(10) Patent No.: US 10,745,152 B2
(45) Date of Patent: Aug. 18, 2020

(54) ATTITUDE STABILIZATION AND ORBITAL DISTRIBUTION FOR SMALL SATELLITES

(71) Applicant: Swarm Technologies, Inc., Los Altos, CA (US)

(72) Inventors: Sara Spangelo, Mountain View, CA (US); Benjamin Longmier, Los Altos, CA (US)

(73) Assignee: SWARM TECHNOLOGIES, INC., Los Altos, CA (US)

( * ) Notice: Subject to any disclaimer, the term of this patent is extended or adjusted under 35 U.S.C. 154(b) by 231 days.

(21) Appl. No.: 15/993,391

(22) Filed: May 30, 2018

(65) Prior Publication Data

US 2018/0346155 A1    Dec. 6, 2018

Related U.S. Application Data (60) Provisional application No. 62/513,941, filed on Jun. 1, 2017.

(51) Int. Cl.
| | |
|---|---|
| *B64G 1/34* | (2006.01) |
| *B64G 1/10* | (2006.01) |
| *B64G 1/44* | (2006.01) |
| *H04B 7/185* | (2006.01) |

(52) U.S. Cl.
CPC ............. *B64G 1/34* (2013.01); *B64G 1/1007* (2013.01); *B64G 1/443* (2013.01); *H04B 7/18515* (2013.01); *H04B 7/18519* (2013.01)

(58) Field of Classification Search
CPC ......... B64G 1/443; B64G 1/1007; B64G 1/34
See application file for complete search history.

(56) References Cited

U.S. PATENT DOCUMENTS

| | | | |
|---|---|---|---|
| 3,168,263 A | 2/1965 | Kamm | |
| 3,258,225 A * | 6/1966 | Esch | B64G 1/10 |
| | | | 244/173.1 |
| 5,522,569 A | 6/1996 | Steffy et al. | |
| 5,755,406 A * | 5/1998 | Aston | B64G 1/1007 |
| | | | 244/159.4 |
| 6,102,339 A | 8/2000 | Wu et al. | |
| 6,137,171 A | 10/2000 | Joshi | |
| 6,206,327 B1 * | 3/2001 | Benedetti | B64G 1/10 |
| | | | 244/159.4 |

(Continued)

FOREIGN PATENT DOCUMENTS

| | | |
|---|---|---|
| WO | 2008034550 | 3/2008 |
| WO | 2016 097955 A1 | 6/2016 |

*Primary Examiner* — Philip J Bonzell
*Assistant Examiner* — Tye William Abell
(74) *Attorney, Agent, or Firm* — DLA Piper LLP (US)

(57) ABSTRACT

A satellite that includes a housing, a circuit board containing circuitry and disposed in the housing, a battery disposed in the housing and electrically connected to the circuit board, one or more weights disposed in the housing, wherein the one or more weights are disposed away from a center of the housing, one or more solar panels on the housing and electrically connected to the circuit board, and an antenna electrically connected to the circuit board and including at least one segment that extends out of the housing. When multiple satellites are launched into orbit having different mass weights, they move away from each other at least partially because of the weight difference. In orbit, each satellite is subjected to aerodynamic drag torque and gravity gradient torque.

18 Claims, 10 Drawing Sheets

(56) References Cited

U.S. PATENT DOCUMENTS

| | | | |
|---|---|---|---|
| 7,513,462 B1* | 4/2009 | McKinnon | B64G 1/1007 244/173.1 |
| 2014/0039729 A1* | 2/2014 | Puig-Suari | B64G 1/10 701/3 |
| 2016/0137319 A1* | 5/2016 | Steele | B64G 1/222 52/745.2 |
| 2018/0037341 A1* | 2/2018 | Kalman | B64G 1/222 |

* cited by examiner

ATTITUDE STABILIZATION AND ORBITAL DISTRIBUTION FOR SMALL SATELLITES

RELATED APPLICATIONS

This application claims the benefit of U.S. Provisional Application No. 62/513,941 filed on Jun. 1, 2017, and which is incorporated herein by reference.

FIELD OF THE INVENTION

The present invention relates to satellites, and more particularly to small scale satellites.

BACKGROUND OF THE INVENTION

Artificial satellites have traditionally been relatively large-scale devices deployed in orbits about the earth for observation of the earth's surface, or carrying directive antennas for use as communications repeaters. Such satellites must be oriented with respect to the earth to function effectively. Previously proposed satellite orientation techniques have relied upon reaction jets, or rotating fly-wheels, to rotate the satellite into the desired orientation in response to a sensing device as the satellite orbits the earth. Sensing devices have included electromagnetic radiation sensitive devices for sensing the position of the horizon circle of the earth as seen from the satellite, gyroscopic devices for determining the gravity vertical of the earth, sun sensors, horizon sensors, and star trackers. However, the effective life of reaction jet orientation systems is limited by the amount of jet fuel carried aboard the satellite, as well as by the rate of expenditure of fuel required by stabilization of satellite perturbations. Fly-wheel arrangements are inherently heavy, consume a great deal of the limited power available aboard a satellite that is oriented by applying torque to revolve an internal wheel, and provide a failure point with the use of bearings.

More recently, smaller, single use satellites have been contemplated. However, as the size of satellites are reduced, it becomes more difficult to scale down the size and power/fuel consumption of devices used to orient the satellite or keep the satellite oriented.

BRIEF SUMMARY OF THE INVENTION

The aforementioned problems and needs are addressed by a satellite that includes a housing, a circuit board containing circuitry and disposed in the housing, a battery disposed in the housing and electrically connected to the circuit board, one or more weights disposed in the housing, wherein the one or more weights are disposed away from a center of the housing, one or more solar panels on the housing and electrically connected to the circuit board, and an antenna electrically connected to the circuit board and including at least one segment that extends out of the housing.

A method of deploying a plurality of satellites, wherein each of the plurality of satellites includes a housing, a circuit board containing circuitry and disposed in the housing, a battery disposed in the housing and electrically connected to the circuit board, one or more weights disposed in the housing, wherein the one or more weights are disposed away from a center of the housing, one or more solar panels on the housing and electrically connected to the circuit board, and an antenna electrically connected to the circuit board and including at least one segment that extends out of the housing, wherein the one or more weights in a first of the plurality of satellites has a first mass, and the one or more weights in a second of the plurality of satellites has a second mass greater than the first mass. The method includes launching the plurality of satellites into orbit around the earth, wherein the first and second satellites move away from each other in orbit at least partially due to the second mass being greater than the first mass.

A method of deploying a satellite that includes a housing having a frame and top and bottom opposing panels mounted to the frame and side panels disposed between the top and bottom opposing panels and mounted to the frame wherein the each of the top and bottom opposing panels has a surface area greater than that of each of the side panels, a circuit board containing circuitry and disposed in the housing, a battery disposed in the housing and electrically connected to the circuit board, one or more weights disposed in the housing, wherein the one or more weights are disposed away from a center of the housing, one or more solar panels on the housing and electrically connected to the circuit board, and an antenna electrically connected to the circuit board and including at least one segment that extends out of the housing. The method includes launching the satellite into orbit around the earth such that in orbit the satellite is subjected to aerodynamic drag torque and gravity gradient torque.

Other objects and features of the present invention will become apparent by a review of the specification, claims and appended figures.

DETAILED DESCRIPTION OF THE INVENTION

The present invention is directed to a miniature satellite that accomplishes all or virtually all its major functions (e.g. two-way communications) using circuitry on a single circuit board. The satellite does not require any active attitude control systems, nor any typically sized (large) batteries and solar panels, which are common for such satellite systems. The satellite can stabilize itself in Low Earth Orbit (LEO), and groups of such satellites can spread out in orbit from one another with no use of power or active control systems.

As shown in FIGS. 1A-1G, the satellite 10 includes a housing 12 made of opposing top and bottom panels 13 and side panels 14, mounted to a frame 16 preferably made of a lightweight metal such as an aluminum alloy (e.g., aluminum 7075, 6061, 5005, and/or 5052). One or more dense weights 18 are mounted to one side of the frame 16 (i.e. away from a center of the housing 12). The weight(s) 18 can be one or more of steel, stainless steel, lead, iron, copper, tungsten, depleted-uranium, nickel, ceramic, or any other relatively dense material). A printed circuit board (PCB) 20 is disposed inside the housing 12 and includes circuitry 22 for performing the operational functions of the satellite 10, and a power supply 24 (e.g., a lithium-ion battery) for powering those operational functions. Preferably, the battery 24 is positioned near one edge of the PCB and adjacent the weight(s) 18 to contribute to the asymmetrical distribution of mass. A dipole antenna 26 is mounted to the PCB 20, and includes a first segment 26a extending out of the housing 12 in one direction and a second segment 26b extending out of the housing 12 in an opposite direction. Preferably, the antenna is mounted closer to the same edge of the PCB that is adjacent the weight(s) 18, to further contribute to the asymmetrical distribution of mass. One of the functions of circuitry 22 is communications using antenna 26, as discussed further below. One or more solar panels 28 are formed on one or both of the top and bottom panels 13, and are connected to the PCB 20 for providing power to the circuitry 22 and/or to recharge battery 24.

Figure 1A:
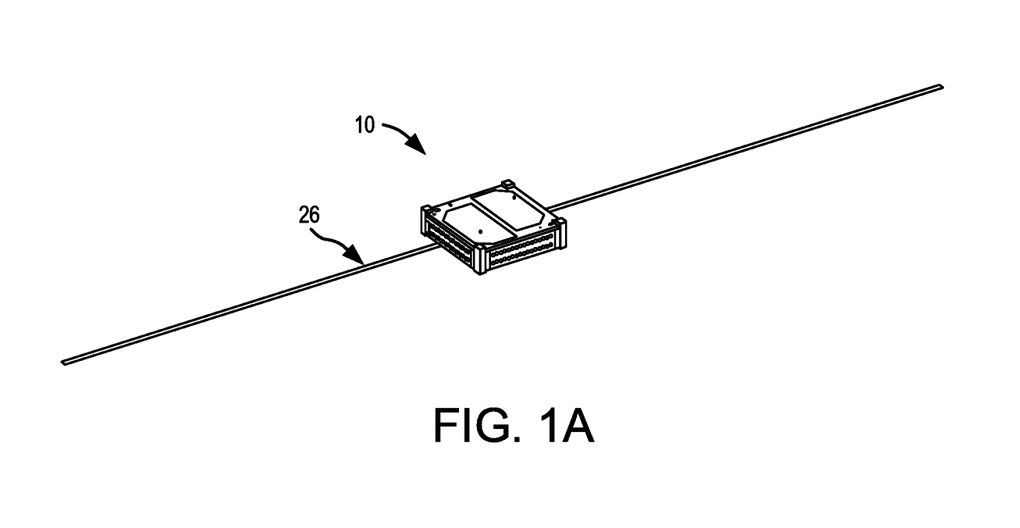
FIG. 1A is a perspective view of the satellite.
Figure 1B:
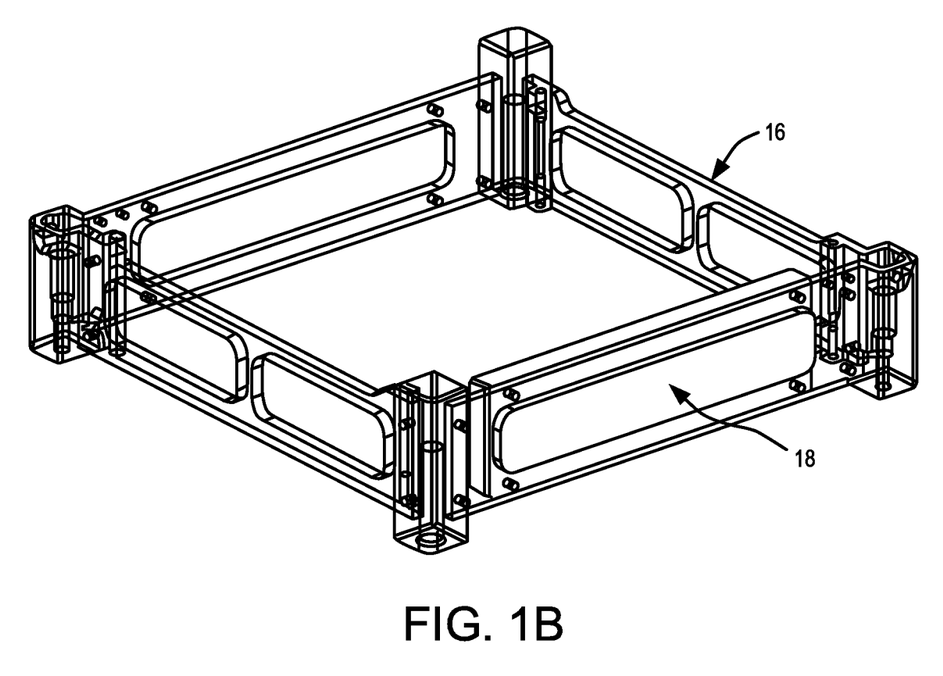
FIG. 1B is a perspective view of the frame of the satellite.
Figure 1C:
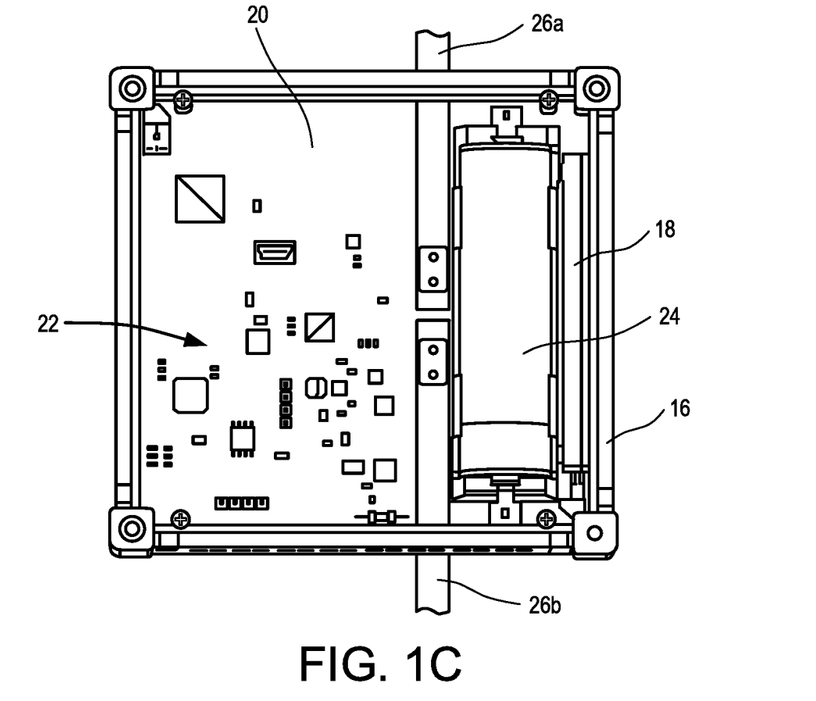
FIG. 1C is a top view of the satellite with the top panel removed.
Figure 1D:
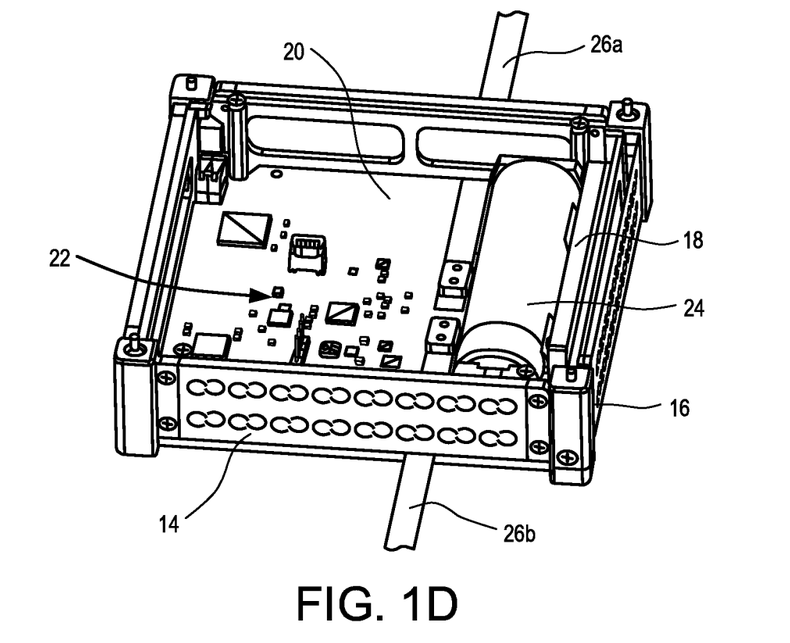
FIG. 1D is a perspective view of the satellite with the top panel removed.
Figure 1E:
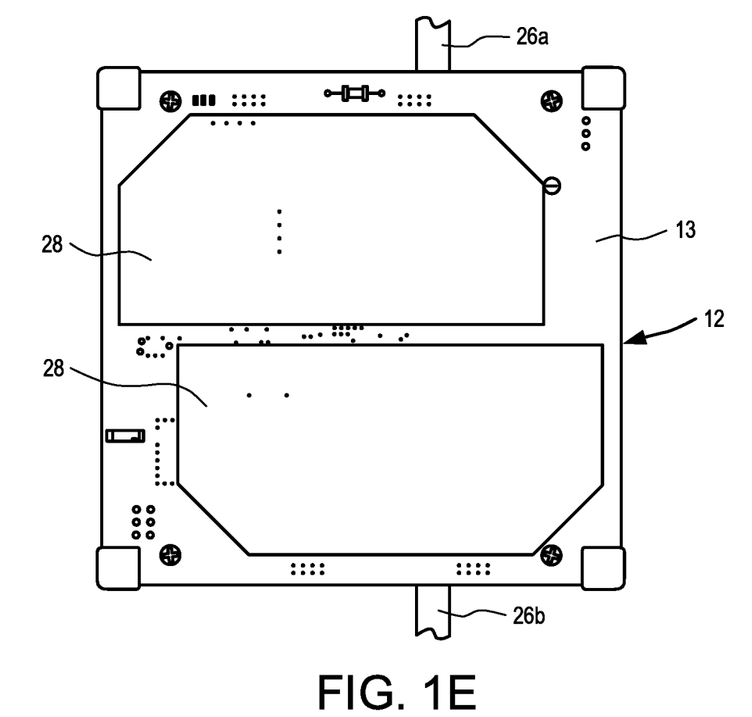
FIG. 1E is a top view of the satellite.
Figure 1F:
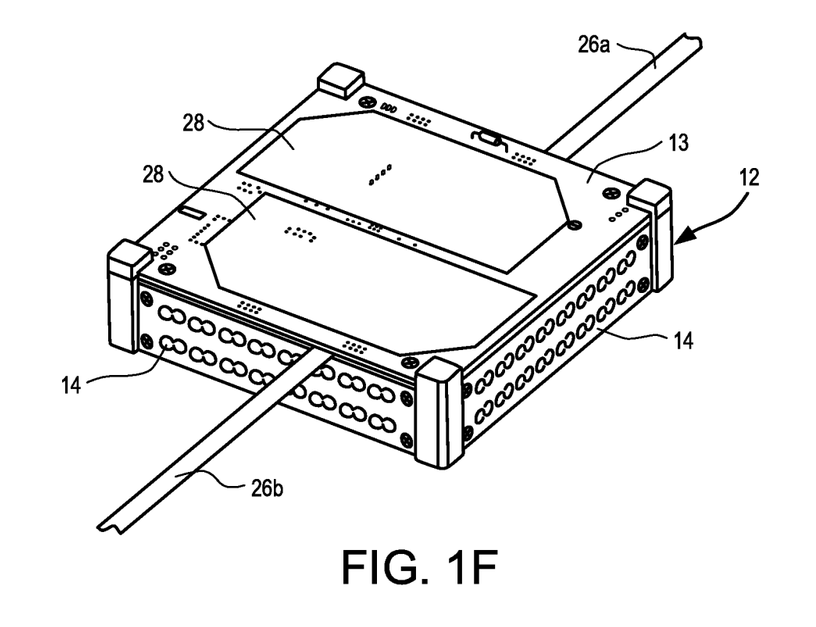
FIG. 1F is a perspective view of the satellite.
Figure 1G:
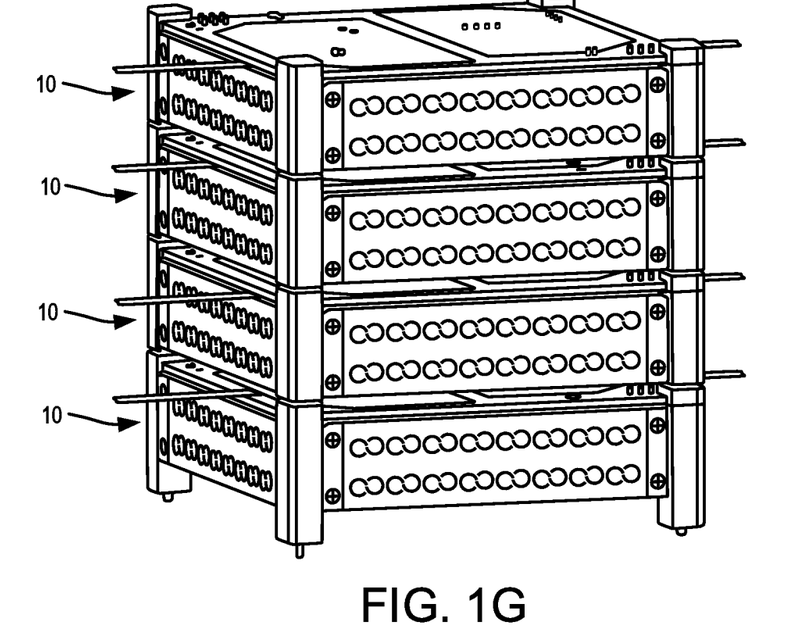
FIG. 1G is a side view of a stack of the satellites.

In a non-limiting example, preferably, satellite 10 is ¼-U in size or smaller (where 1 U is defined as a CubeSat standard of 10 cm×10 cm×10 cm) and a mass of less than 1.33 kg. Therefore, the satellite's preferred dimensions (approximately 10 cm×10 cm×2.5 cm) are compatible with standard carrier containers (e.g. P-PODs). When stacked together as shown in FIG. 1G for deployment by a single launch vehicle, multiple satellites 10 slide along the standard CubeSat deployment rails inside of the carrier, and therefore do not require customized deployment systems. The satellite's printed circuit board (PCB) area is 9.5 cm×9.5 cm, allowing each satellite to be manufactured with traditional electronics pick and place machines. Mass production can be achieved at low cost, since all or virtually all of the satellite electrical components are on a single circuit board. Once the satellite is manufactured and all components are assembled, the entire satellite, including onboard solar panel(s) 28, occupies a volume of 280 cubic centimeters. The satellite electronics are largely shielded from low energy total ionizing dose (TID) space radiation by the PCB material on the space-facing surface, and the software operated by the circuitry 22 provides an additional layer of redundancy with a watchdog timer and a redundant software bootloader for single event upsets (SEUs).

Preferably, circuitry 22 performs most if not all of the satellite functions, including power collection, power management, sensors, 2-way radio, etc. Circuitry 22 is placed on a single printed circuit board PCB 20. This allows for very high quality builds, fast manufacturing times, and simplified qualification testing on the ground. The design of satellite 10 is ideal for mass manufacturing, which reduces production time by many orders of magnitude compared to current state-of-the-art satellite manufacturing processes (24 hours instead of a typical 6 months to 3 year build time).

Figure 2:
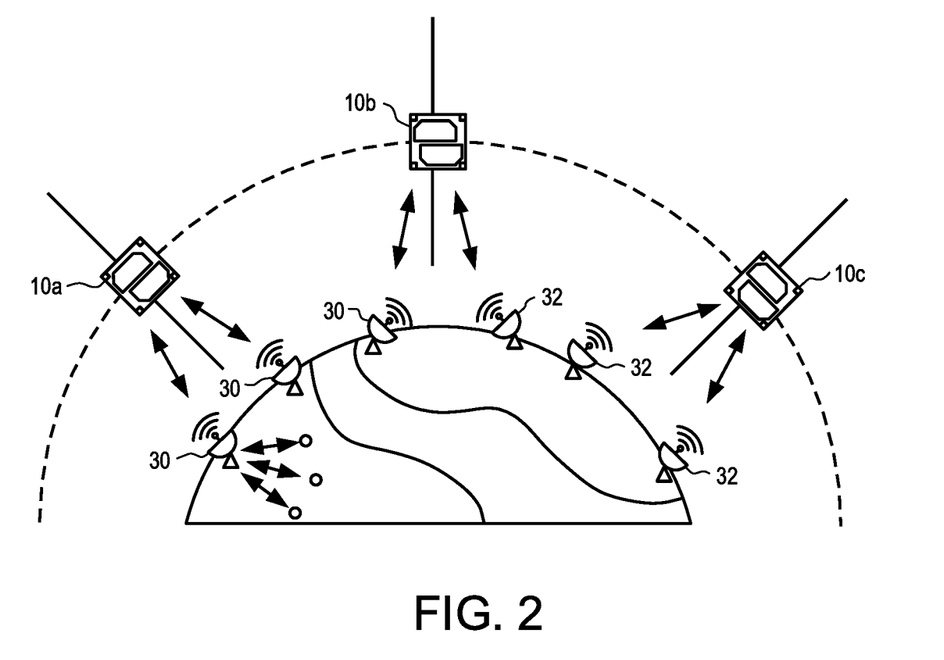
FIG. 2 is a drawing illustrating the communications between orbiting satellites and earth installations.

The satellite 10 serves all of the functions of a typical two-way communications satellite, supporting data relay from ground-to-space, space-to-space, and space-to-ground at a fraction of the size and cost of traditional communications satellites. The result is that the satellite is 1/10,000th the mass of similar communications satellites, can be manufactured for less than 1/1,000th the cost, and can be launched for 1/10,000th the cost due to its small mass. The satellite's functions performed by circuitry 22 include receiving data, processing data, storing data, transmitting data, networking with other satellites in space or other communications nodes on the ground, and executing all events with on-board scheduling that optimizes power consumption and data transfer. FIG. 2 provides a representation of the network communications architecture, which connects satellites 10, gateways 30 (capable of data aggregation and two-way communication with satellites), and ground stations 32 (capable of two-way communication with satellites and connected to the Internet). FIG. 2 shows the network architecture and how the satellites communicate with each other from ground and space nodes, where data can be relayed in near real-time across the globe. FIG. 2 shows three examples, with the first involving ground aggregation to one of the gateways 30 and satellite 10a being used for gateway-to-satellite-to-gateway communications, the second involving satellite 10b used for gateway-to-satellite-to-ground station communications, and the third involving satellite 10c being used as a communications relay between two Internet connected ground stations.

Figure 3:
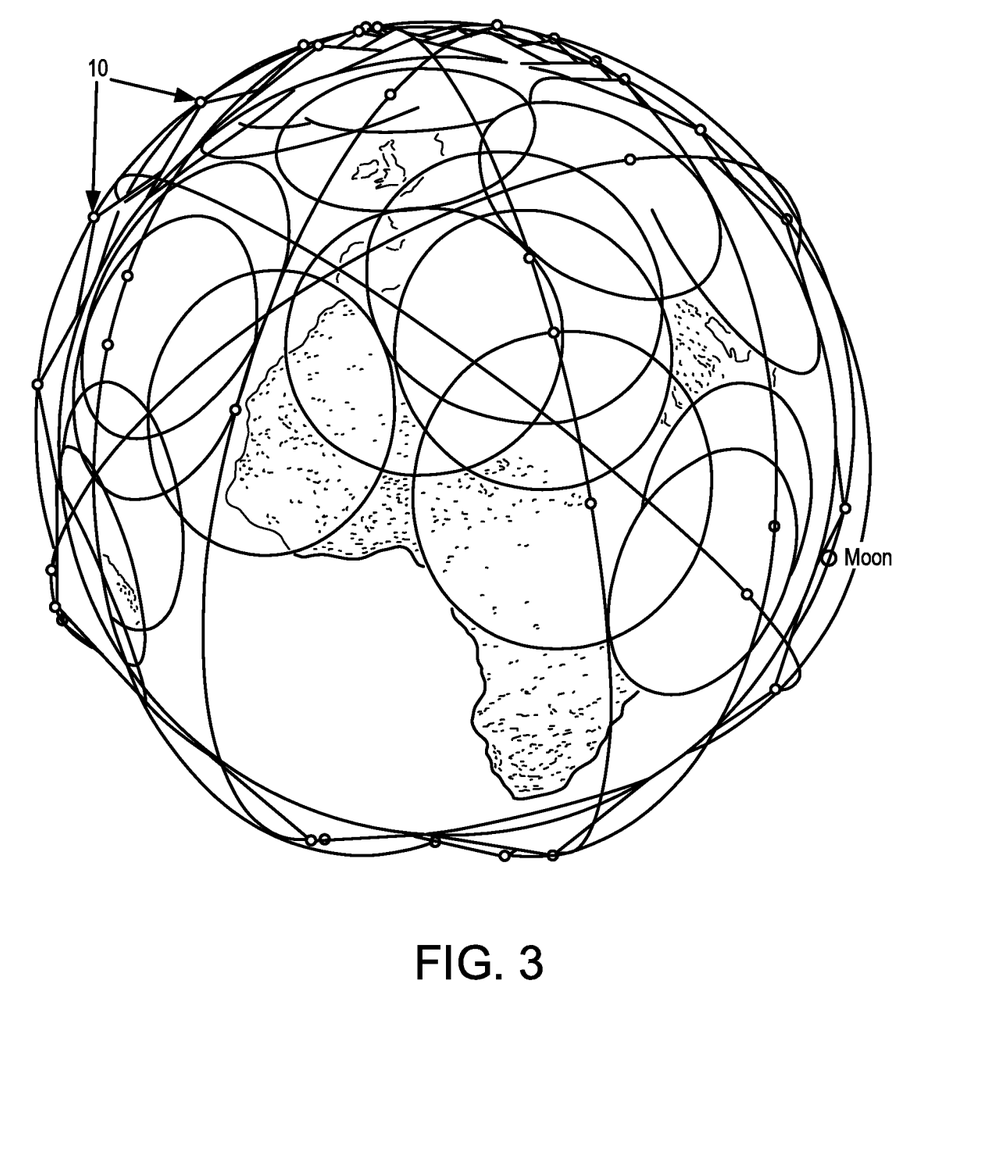
FIG. 3 is a drawing illustrating a constellation of the satellites 10 deployed and spread out in a single orbital plane.

The asymmetrical weighting of the satellite due to the inclusion of weight(s) 18 provides the stabilization in drag and gravity gradient as discussed further below. Moreover, for a group of satellites 10 launched into orbit using the same launch vehicle, the number of plates, size and/or materials used for the weights can be varied, so that the total mass of the weight(s) 18 varies between different satellites. This variation in mass between satellites creates differences (1-60%) in the satellites' ballistic coefficients that will cause a group of differentially weighted satellites launched together to subsequently spread out in orbit over time. FIG. 3 shows a constellation of satellites 10, all of which are deployed and then spread out in the same orbital plane. The constellation can be made up of several orbital planes, to cover most of the Earth with two-way communications at low cost. Nearly global continuous coverage can be obtained with as few as 100 such satellites. The distribution of satellites in a single orbital plane is achieved by differential weighting of each satellite 10, which results in ballistic coefficients that preferably vary by 1-60%. Multiple orbital planes are preferred to increase the ground coverage.

Figure 4A:
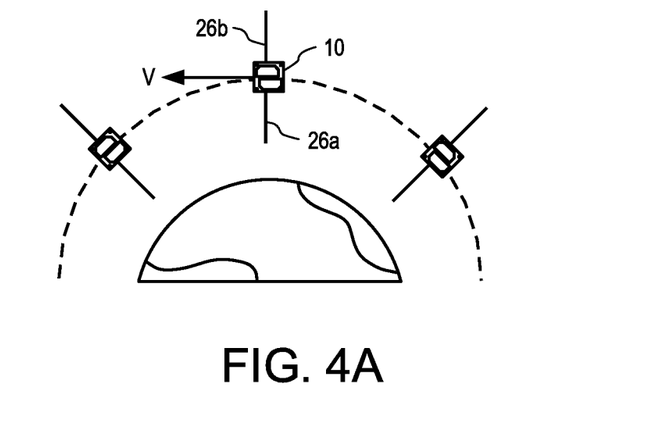
FIG. 4A is a drawing illustrating the velocity vector of an orbiting satellite.
Figure 4B:
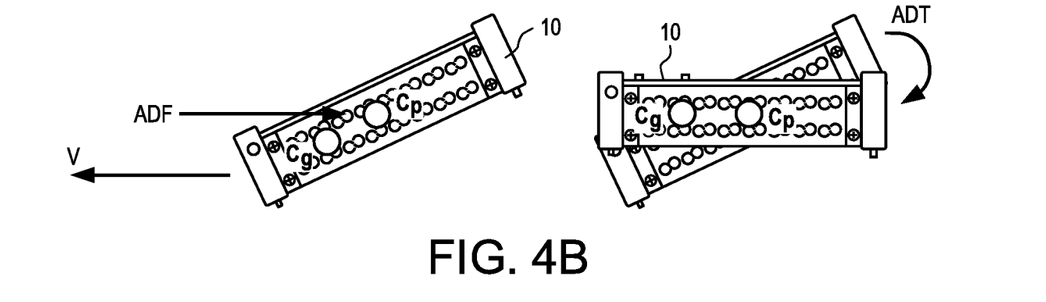
FIG. 4B is a drawing illustrating the aerodynamic drag force ADF and aerodynamic drag torque ADT on an orbiting satellite.
Figure 4C:
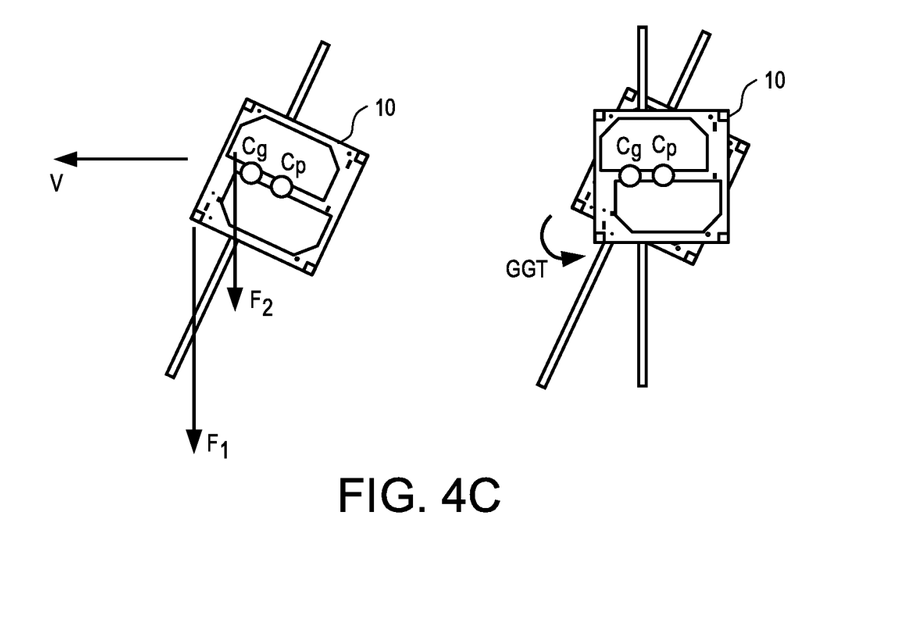
FIG. 4C is a drawing illustrating the gravity gradient torque GGT on an orbiting satellite.

The satellite 10 utilizes a new attitude control scheme (ACS), which is completely passive and requires no power, as shown in FIGS. 4A-4C. The satellites 10 are weighted so that the center of gravity $C_g$ is offset from the center of pressure $C_p$. Specifically, the center of gravity $C_g$ is located closer to the edge of the satellite 10 containing the weight(s) 18, and the center of pressure $C_p$ is located at approximately the geometric center of the satellite for the box shaped satellite 10. In orbit, with the satellite 10 traveling with a velocity vector V, it encounters an aerodynamic drag force ADF that causes an aerodynamic drag torque ADT which causes the satellite to rotate as shown in FIGS. 4A-4B. The atmospheric drag torque ADT stabilizes the satellite 10 about one axis of rotation (parallel to the longer panel dimensions of the top and bottom panels 13). The atmospheric drag is a damped force/torque, therefore the rates of rotation will decrease over time. The satellite 10 also takes advantage of gravity gradient torque derived from its mass distribution (long, slender weights and a long and slender battery) to stabilize itself about the second and third axes of rotation as shown in FIG. 4C. Specifically, the difference in gravitational forces F1 and F2 for weight(s) 18 (where F1 is greater than F2) causes a gravity gradient torque GGT to rotate the satellite. This torque is not damped, so the satellite will continue to have small oscillations about these axes indefinitely. Eventually these rates of rotation are damped by atmospheric forces. Since the mass distribution meets the criteria for gravity gradient static stability, these small oscillations do not grow, and gravity gradient torques thus help stabilize the satellite in the presence of small disturbances.

Through the use of these coupled passive stabilization techniques (gravity-gradient stabilization and aerodynamic drag stabilization), the satellite 10 stabilizes to a preferential orientation with respect to the Earth. The gravity gradient torques are ultimately damped via coupled moments of inertia with the atmospheric drag torque. When the satellite is stabilized, the dipole antenna segment 26a and 26b remain constantly pointed towards and away from the Earth, respectively, to provide a high gain pattern at the horizons, which maximizes the time that one satellite is able to communicate with other satellites in space or with ground terminals. For most locations on the ground, the satellite spends more time at lower elevation angles above the horizon than high elevation angles, so overall this satellite orientation and antenna gain pattern maximizes the data transfer capability of the network. Because the satellite dedicates no power to attitude control systems, it can provide all of the collected solar power from panels 28 and stored energy in the battery 24 to the onboard communications systems and a low-power onboard processor (part of the circuitry 22).

This ACS scheme is ideally suited for satellite orbits that occupy a Sun Synchronous Orbit, because it naturally orientates the solar panels 28 in a favorable direction towards the Sun, but can be beneficial in all Earth orbits. The ACS scheme is implemented by optimal placement of the weight(s) 18, battery 24 and/or any other large mass components on the PCB 20, which constitutes the majority of the spacecraft mass, and exploiting natural gravitational and drag forces and moments in LEO.

Figure 5:
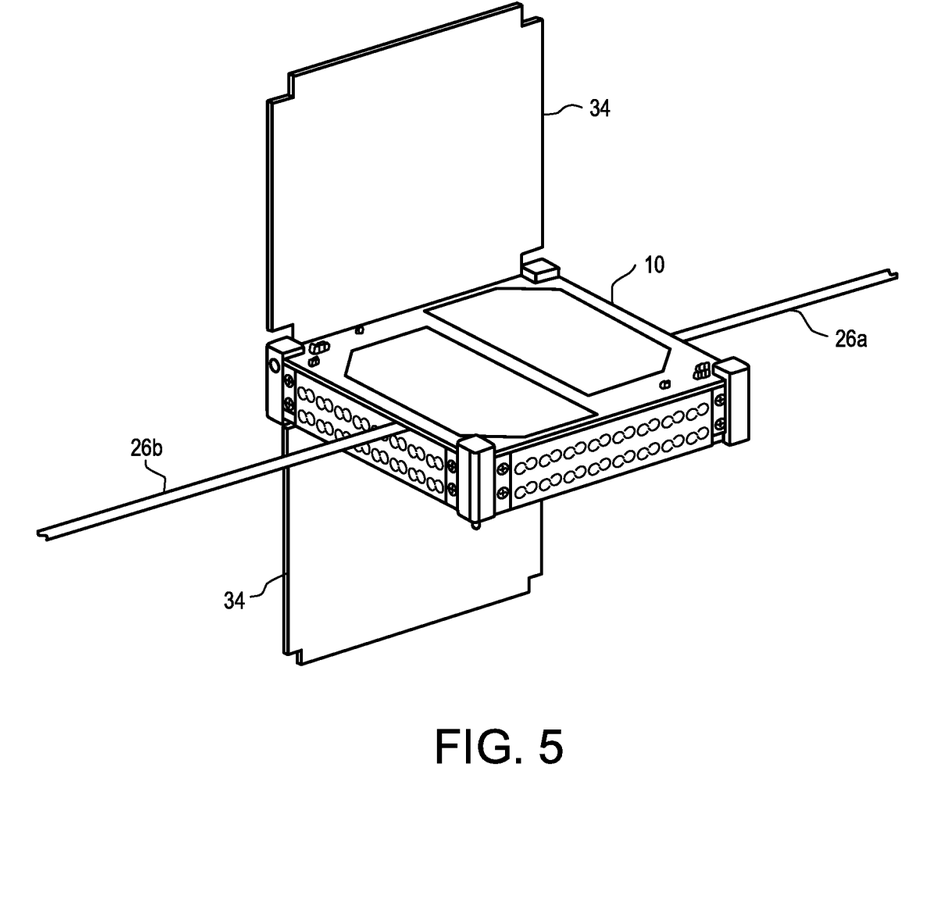
FIG. 5 is a perspective view of the satellite with deployable drag flaps in their extended position.

Drag stabilization shown in FIG. 4B is achieved with the mass of the battery and weight(s) (the major mass contributor to the satellite) placed to one edge of the satellite (adjacent one of the side panels 14) such that the center of mass and the center of pressure are located at different points in the satellite. Preferably, the center of gravity is located near the edge of the satellite, and the center of pressure is located at approximately the geometric center of the satellite. This provides the passive stability by drag forces. FIG. 5 illustrates an alternate embodiment, where the center of pressure is extended even farther aft away from the weight(s) by using deployable drag flaps 34, which are panels that rotate after deployment to an extended position extending at least partially away from the plane containing the longer dimensions of the housing 12. Before deployment, draft flaps 34 preferably are folded down in a retracted position where they are disposed over the top and bottom panels 13. The drag flaps 34 in FIG. 5 are mounted to the opposite end of the housing containing the weight(s) 18. In their extended position, drag flaps 34 move the center of pressure Cp farther aft (away from the leading edge of the satellite containing the weight(s) 18 and away from the geometric center of the otherwise box shaped satellite) and shortens the duration at which the satellite stabilizes. The drag flaps can be moved to their extended position by a spring, actuator or motor.

Figure 6:
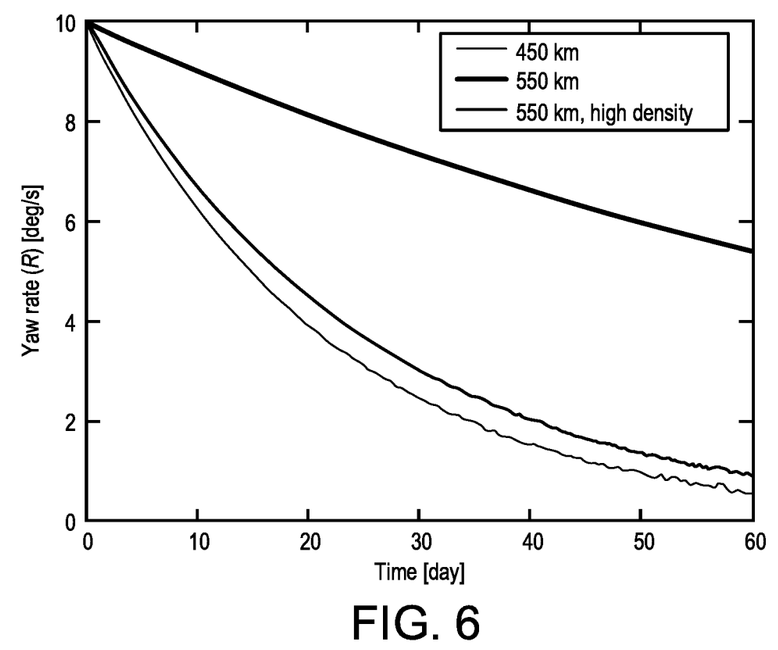
FIG. 6 is a graph illustrating rotation rate damping in all axes.
Figure 7:
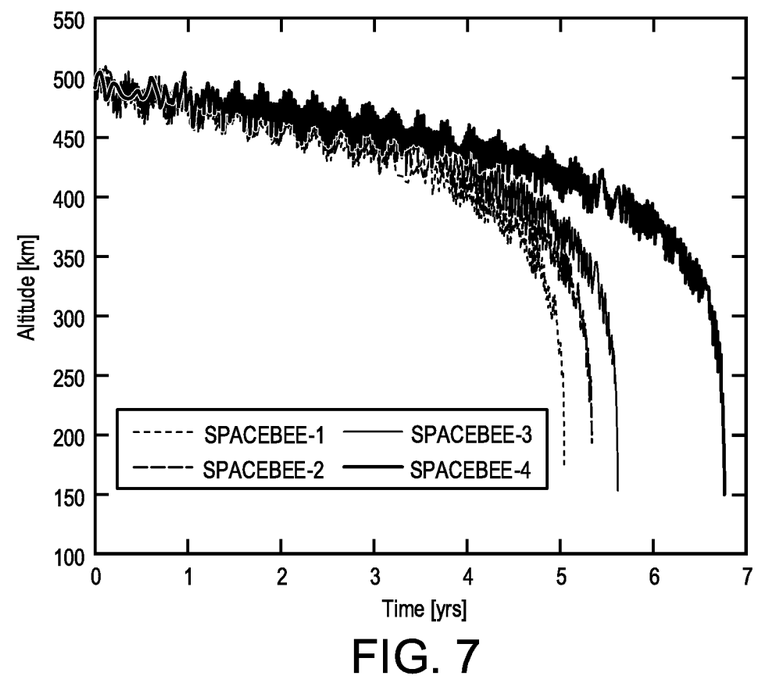
FIG. 7 is a graph illustrating orbital spreading by altitude due to varying ballistic coefficients from differing weights or weight values placed in the satellites.
Figure 8:
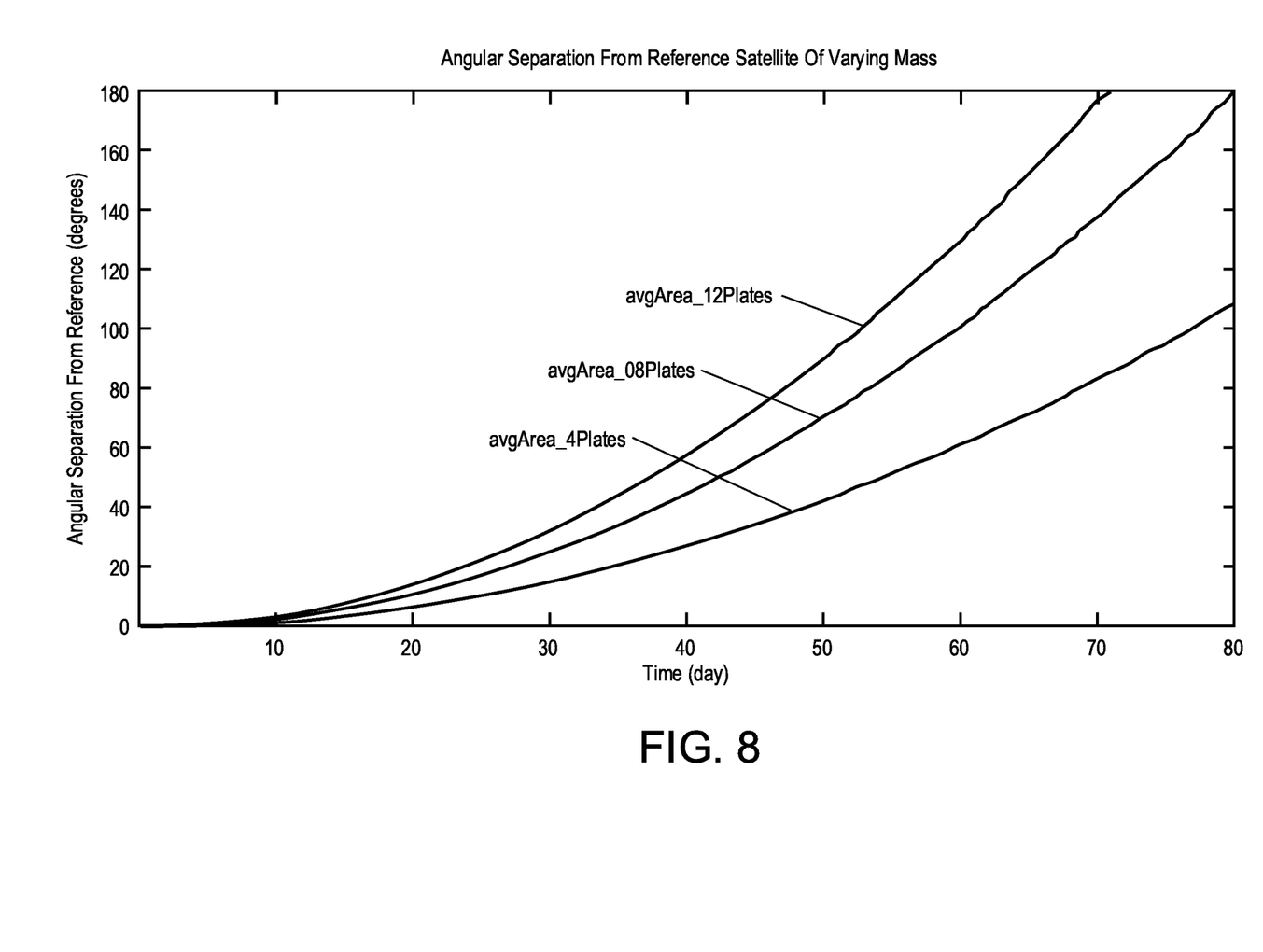
FIG. 8 is a graph illustrating orbital spreading by angular separation due to varying ballistic coefficients from differing weights or weight values placed in the satellites.
Figure 9:
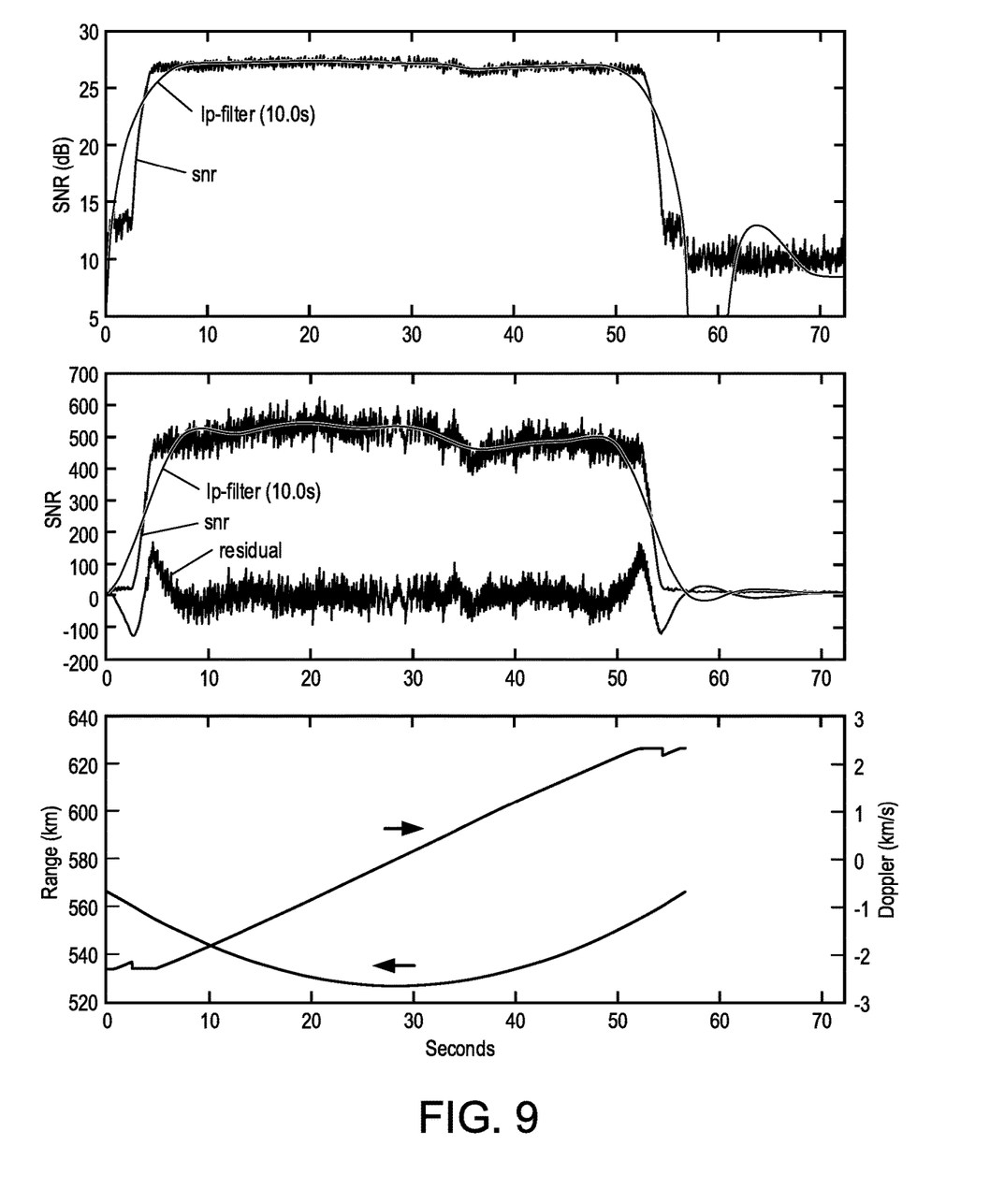
FIG. 9 are graphs of ground radar measurements of the satellite indicating stabilization of the satellite in at least one axis of rotation.

FIGS. 6-9 show performance data for the satellite 10. FIG. 6 illustrates the rotation rate damping in all axes from a damped drag force, which is coupled to the moment of inertia to the gravity gradient torque. FIG. 7 illustrates the orbital spreading by altitude due to varying ballistic coefficients from differing weights or weight values placed in the satellites 10. FIG. 8 illustrates the orbital spreading by angular separation due to varying ballistic coefficients from differing weights or weight values placed in the satellites. A 90 degree phasing (change in RAAN) within the same orbit occurs within approximately one to six months, depending on the difference in ballistic coefficients. FIG. 9 illustrates ground radar measurements of a satellite 10 in Low Earth Orbit at an altitude of 502 km is not tumbling randomly and has stabilized in at least one axis of rotation. Over a 70 second long overhead pass of a radar unit, no significant large rotation rates are observed from the satellite, indicating stability was achieved, at least during the 70 second time period.

The design of satellite 10 provides passive attitude control using no power. Specifically, the design provides control of the attitude (Attitude Control System or ACS) of the satellite in space for alignment in three axes that is passive and requires no power and no additional volume relative to the rest of the satellite, which is stabilized with the simultaneous use of the two stabilization techniques (gravity gradient stabilization and drag stabilization). With an initial random rotation rate of 10 degrees/sec (which is typical during deployment), the rotation is nearly fully damped out within several weeks at an altitude of 550 km (see FIG. 6).

The gravity gradient stabilization is shown in FIGS. 4C and 9. This stabilization is achieved with the shape of the battery 18 and one or more weights 18 (which are the major mass contributor to the satellite) which have a high aspect ratio, with a long and slender shape (i.e. opposing top and bottom panels 13 each having a greater surface area than any of the four side panels 14). The elongated shape is subject to an alignment torque that stabilizes to point the side panel 14 from which the antenna segment 26a extends (and antenna segment 26a itself) radially towards the center of the Earth, and the side panel 14 from which the antenna segment 26b extends (and antenna segment 26b itself) radially away from the Earth (see FIG. 4A). The gravity gradient is an undamped torque, but this torque is ultimately damped via the drag force/torque. Most rotation about this gravity gradient axis is quickly transferred to the other axes due to both secondary axis instability (Euler equations of rigid body motion) and the major axis theorem, and from kinetic energy loss. FIG. 9 shows such stabilization.

The passive ACS system enables the satellite to achieve coarse pointing. Therefore, the attached communications antenna segments 26a and 26b will point roughly radial with the Earth in order to provide a desired gain pattern with respect to the Earth. This allows the communications antennas to be designed for high gain beam spots that are pointed towards the Earth, or for high gain along the horizons of the Earth to optimize the communications gain/distance/bit-rate for long distance telecommunications.

The passive ACS system also enables the satellite to achieve coarse pointing such that at least one face of the satellite and the set of solar panels mounted thereon, point roughly at the Sun. Preferably, there are solar panels 26 mounted on both of the larger opposing top and bottom panels 13 of the satellite. In a Sun-synchronous orbit that is roughly close to terminator, one face of the satellite, and hence one solar panel array, is always roughly pointed towards the Sun for a majority of the orbital period after the satellite has stabilized. In other Earth orbits, the solar panels have some non-normal facing direction towards the Sun, but the ACS scheme is still effective in roughly pointing the solar panel face towards the Sun.

If higher accuracy pointing is needed, or active control is needed, the use of a single magnetorquer can be used to reduce the initial rotation rates and to orient the satellite in a desired attitude in orbit. Because the satellite is traveling through a non-uniform magnetic field that is produced by the Earth, a single magnetorquer can be used at opportunistic times during the satellite's orbit in order to achieve more precise attitude control. A magnetorquer is well known in the art, and is essentially an electromagnet which is laid out to yield a rotationally asymmetric (anisotropic) magnetic field over an extended area. That field is controlled by switching current flow through the coils on or off, usually under computerized feedback control. Because magnet itself is mechanically anchored to the satellite 10, any magnetic force it exerts on the surrounding magnetic field will lead to a magnetic reverse force and result in mechanical torque about the satellite's center of gravity. This makes it possible to freely pivot the craft around in a known local gradient of the magnetic field by only using electrical energy. For compactness, the magnetorquer can be built into the traces on the periphery of the PCB 20.

Orbital spreading is achieved by varying the ballistic coefficients by using different weights for the satellites that are launched into the same orbit, as shown in FIGS. 7 and 8. The weights are placed in roughly the same location in each satellite and are made of very dense materials (low volume per mass), so slight differences in overall mass can be implemented with very little impact on the Cg location within the satellite. Varying the ballistic coefficient affects atmospheric drag and reduces the orbital altitude of the satellite, which in turn spreads the satellites out from one another. This spreading in orbit is achieved by a variable number of weights or total mass of the weight(s) used to give each satellite a different mass than other satellites that are launched into orbit at the same time. The typical mass difference can be 5% from satellite to satellite, with a minimum difference of 1% and a maximum difference of up to 60% between the lightest and heaviest satellite. As an alternative to different masses on each satellite, variable drag-increasing-devices may also be used to change the effective ballistic coefficient and therefore rate of spreading. For example, drag flaps 34 of different sizes can be used, which change the effective area of the satellite, and therefore changes the drag experience among the various satellites, which causes a slow spreading of the satellites out from one another.

The satellite 10 is ideal for one-way and two-way communications between the ground and space, which may use a radio frequency between 1 kHz and 100 GHz. The satellite can achieve one or multiple types of two-way communications, including ground-to-space communications, space-to-ground communications, inter-satellite (in space) cross-linked communications, ground-to-ground communications, and Internet-to-ground communications, ground-to-internet communications. A plurality of satellites 10 can be carried to orbit and deployed at the same time from a larger satellite deployer (called a P-POD or QuadPack).

It is to be understood that the present invention is not limited to the embodiment(s) described above and illustrated herein, but encompasses any and all variations falling within the scope of any claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Hardware, software and/or firmware can be used to implement the functionality of the satellite 10. It should further be appreciated that functionality can be implemented as computer-executable instructions stored on a non-transitory computer readable medium, such a CD or DVD (including re-writable CDs and DVDs), flash or other non-volatile memory, ROM, EEPROM, disc drive, solid state drive, etc.

What is claimed is:

1. A satellite, comprising:
   a housing;
   a circuit board containing circuitry and disposed in the housing;
   a battery disposed in the housing and electrically connected to the circuit board;
   one or more weights disposed in the housing, wherein the one or more weights are disposed away from a center of the housing;
   one or more solar panels on the housing and electrically connected to the circuit board; and
   an antenna electrically connected to the circuit board and including at least one segment that extends out of the housing;
   wherein no circuitry is disposed in the housing other than the circuitry contained by the circuit board.

2. The satellite of claim 1, wherein the at least one segment of the antenna includes a first segment that extends lengthwise out of the housing in one direction and a second segment that extends lengthwise out of the housing in a second direction that is opposite to the first direction.

3. The satellite of claim 1, wherein the battery is disposed away from the center of the housing.

4. The satellite of claim 1, wherein the center is a center of pressure of the housing.

5. The satellite of claim 1, wherein the center is a geometric center of the housing.

6. The satellite of claim 1, wherein the one or more weights comprise one or more plates of material including at least one or more of metal and ceramic.

7. The satellite of claim 6, wherein the material of the one or more plates includes at least one of steel, stainless steel, lead, iron, copper, tungsten, depleted-uranium, nickel and ceramic.

8. The satellite of claim 1, wherein the housing comprises:
   a frame;
   top and bottom opposing panels mounted to the frame;
   side panels disposed between the top and bottom opposing panels and mounted to the frame.

9. The satellite of claim 8, wherein the each of the top and bottom opposing panels has a surface area greater than that of each of the side panels.

10. The satellite of claim 8, wherein the one or more weights are adjacent to and extend along one of the side panels.

11. The satellite of claim 8, further comprising:
a first panel mounted to the housing and rotatable between a folded position disposed over the top panel and an extended position disposed at least partially extending away from the top panel;
a second panel mounted to the housing and rotatable between a folded position disposed over the bottom panel and an extended position disposed at least partially away from the bottom panel.

12. The satellite of claim 8, wherein the one or more solar panels are on the top panel.

13. The satellite of claim 12, further comprising one or more solar panels on the bottom panel.

14. A satellite, comprising:
a housing;
a circuit board containing circuitry and disposed in the housing;
a battery disposed in the housing and electrically connected to the circuit board;
one or more weights disposed in the housing, wherein the one or more weights are disposed away from a center of the housing;
one or more solar panels on the housing and electrically connected to the circuit board;
an antenna electrically connected to the circuit board and including at least one segment that extends out of the housing;
wherein the at least one segment of the antenna includes a first segment that extends lengthwise out of the housing in one direction and a second segment that extends lengthwise out of the housing in a second direction that is opposite to the first direction; and
wherein the one or more weights are elongated in length and extend lengthwise along one side of the housing in a third direction parallel to the first and second directions.

15. The satellite of claim 14, wherein the battery is elongated in length and extends lengthwise parallel to the third direction.

16. A method of deploying a plurality of satellites, wherein each of the plurality of satellites includes:
a housing,
a circuit board containing circuitry and disposed in the housing,
a battery disposed in the housing and electrically connected to the circuit board,
one or more weights disposed in the housing, wherein the one or more weights are disposed away from a center of the housing,
one or more solar panels on the housing and electrically connected to the circuit board, and
an antenna electrically connected to the circuit board and including at least one segment that extends out of the housing,
wherein the one or more weights in a first of the plurality of satellites has a first mass, and the one or more weights in a second of the plurality of satellites has a second mass greater than the first mass;
the method comprising:
launching the plurality of satellites into orbit around the earth, wherein the first and second satellites move away from each other in orbit at least partially due to the second mass being greater than the first mass.

17. The method of claim 16, wherein each of the plurality of satellites further comprises:
a frame,
top and bottom opposing panels mounted to the frame,
side panels disposed between the top and bottom opposing panels and mounted to the frame,
a first panel mounted to the housing and rotatable between a folded position disposed over the top panel and an extended position disposed orthogonal to the top panel,
a second panel mounted to the housing and rotatable between a folded position disposed over the bottom panel and an extended position disposed orthogonal to the bottom panel,
wherein the first and second panels of the first satellite have a size that is different from that of the first and second panels of the second satellite;
the method further comprising:
after the launching, moving the first and second panels for each of the plurality of satellites from the folded position to the extended position.

18. A method of deploying a satellite that comprises:
a housing that includes:
a frame,
top and bottom opposing panels mounted to the frame,
side panels disposed between the top and bottom opposing panels and mounted to the frame,
wherein the each of the top and bottom opposing panels has a surface area greater than that of each of the side panels,
a circuit board containing circuitry and disposed in the housing,
a battery disposed in the housing and electrically connected to the circuit board,
one or more weights disposed in the housing, wherein the one or more weights are disposed away from a center of the housing,
one or more solar panels on the housing and electrically connected to the circuit board, and
an antenna electrically connected to the circuit board and including at least one segment that extends out of the housing,
the method comprising:
launching the satellite into orbit around the earth such that in orbit the satellite is subjected to aerodynamic drag torque and gravity gradient torque;
wherein the at least one segment of the antenna includes a first segment that extends lengthwise out of the housing in one direction and a second segment that extends lengthwise out of the housing in a second direction that is opposite to the first direction, and wherein the combination of aerodynamic drag torque and gravity gradient torque orients the satellite so that the first segment of the antenna extends toward the earth and the second segment of the antenna extends away from the earth.

* * * * *